(12) United States Patent
Zhou et al.

(10) Patent No.: US 12,448,018 B2
(45) Date of Patent: Oct. 21, 2025

(54) FOLDING TROLLEY

(71) Applicant: Yongshuai Zhou, Yongkang (CN)

(72) Inventors: Yongshuai Zhou, Yongkang (CN); Guosen Zou, Wuyi (CN)

(73) Assignee: Yongshuai Zhou, Yongkang (CN)

( * ) Notice: Subject to any disclaimer, the term of this patent is extended or adjusted under 35 U.S.C. 154(b) by 338 days.

(21) Appl. No.: 18/172,512

(22) Filed: Feb. 22, 2023

(65) Prior Publication Data
US 2024/0067247 A1  Feb. 29, 2024

(30) Foreign Application Priority Data
Aug. 26, 2022  (CN) .......................... 202222262357.X (51) Int. Cl.
*B62B 3/02*  (2006.01)

(52) U.S. Cl.
CPC ..................... *B62B 3/025* (2013.01)

(58) Field of Classification Search
CPC ........... B62B 3/025; B62B 3/02; B62B 3/022; B62B 3/027
See application file for complete search history.

(56) References Cited

U.S. PATENT DOCUMENTS

| 11,225,277 B1 * | 1/2022 | Sun | .......................... B62B 5/061 |
| 11,667,313 B2 * | 6/2023 | Wu | .......................... B62B 5/067 |
| | | | 280/651 |

FOREIGN PATENT DOCUMENTS

CN  113635951 A  *  11/2021  ............... B62B 3/02

OTHER PUBLICATIONS

Mechanical translation of CN-113635951-A. (Year: 2021).*

* cited by examiner

*Primary Examiner* — John D Walters
(74) *Attorney, Agent, or Firm* — McDonnell Boehnen Hulbert & Berghoff LLP (57) ABSTRACT

The invention provides a folding trolley, including a front frame assembly, a rear frame assembly, a bottom frame folding and unfolding assembly; side frame folding and unfolding assemblies are arranged on both sides of the bottom frame folding and unfolding assembly; the side frame folding and unfolding assembly includes a scissor rod group, the upper sides of both ends of the scissor rod group are connected to the front frame assembly and the rear frame assembly respectively, and the lower sides of both ends of the scissor rod group are hinged to the front frame assembly and the rear frame assembly respectively; and the front frame assembly and the rear frame assembly are provided with vertical slide grooves, slide blocks are hinged to the both ends of the scissor rod group, and the slide block is arranged within the vertical slide groove.

11 Claims, 13 Drawing Sheets

FOLDING TROLLEY

CROSS REFERENCE TO RELATED APPLICATION

The present application is a non-provisional application claiming priority to Chinese application no. 202222262357.X, filed on Aug. 26, 2022, the contents of which are hereby incorporated by reference.

FIELD

The invention relates to the field of folding trolleys, in particular to a folding trolley.

BACKGROUND

With the improvement of living standards, more and more people like self-driving for outdoor activities. At the same time, a lot of picnic food and outdoor equipment will be carried when self-driving. However, the car for self-driving can only be driven to the parking place, and people need to walk to complete most of the remaining distance. It is very inconvenient for people to carry so many things on foot outdoors. Now, trolleys that can be folded and placed in the trunk are also being sold on the market. When in use, the trolley can be opened to carry picnic food and outdoor appliances, which is convenient for people to carry.

The height of an existing cross-shaped folding trolley will become higher when it is folded and crossed, so in the previous folding trolley design, a bending point is often added at the place where it is connected to the frame, so that the volume and height of the folding trolley after folding is smaller. However, the bending point makes the process more complex, and reduces the strength of the folding trolley.

A cloth sleeve of the existing cross-shaped folding trolley is fixed to a frame by thread gluing, which is inconvenient to disassemble. After the frame is unfolded, the cloth bag is easy to collapse, resulting in inconvenience in use.

SUMMARY

(I) Technical Problems to be Solved

The problem to be solved by the invention is to provide a folding trolley to overcome the defects of complex technology and low strength of an existing folding trolley.

(II) Technical Solution

In order to solve the technical problems, the invention provides a folding trolley, including a front frame assembly and a rear frame assembly arranged at an interval. The front frame assembly and the rear frame assembly are connected through a bottom frame folding and unfolding assembly; side frame folding and unfolding assemblies are symmetrically arranged on both sides of the bottom frame folding and unfolding assembly; and the side frame folding and unfolding assembly includes a scissor rod group, the upper sides of both ends of the scissor rod group are slidably connected to the front frame assembly and the rear frame assembly respectively, and the lower sides of both ends of the scissor rod group are hinged to the front frame assembly and the rear frame assembly respectively.

Further, the front frame assembly and the rear frame assembly are provided with vertical slide grooves, slide blocks are hinged to the lower sides of both ends of the scissor rod group, and the slide block is slidably arranged within the vertical slide groove.

Further, the bottom frame folding and unfolding assembly includes a first folding frame and a second folding frame hinged to each other, the front end of the first folding frame is hinged to the front frame assembly, and the rear end of the second folding frame is hinged to the rear frame assembly. The scissor rod groups located at both sides are connected through a cross rod, and the cross rod is located at the lower side between the first folding frame and the second folding frame; and when folding, the cross rod is pulled up, the front frame assembly and the rear frame assembly are moved to the middle, and the scissor rod group is closed. The bottom frame folding and unfolding assembly further includes a connecting seat, the first folding frame and the second folding frame are hinged to both sides of the connecting seat; and the cross rod abuts against the lower end of the connecting seat.

Further, the lower sides of both ends of the scissor rod group are respectively hinged to the front frame assembly and the rear frame assembly through hinged seats.

Further, the folding trolley further includes a cloth bag and a pull rod assembly, the front end of the cloth bag is fixed to the front frame assembly, the rear end of the cloth bag is fixed to the rear frame assembly, and the pull rod assembly is hinged to the rear frame assembly.

Further, the front frame assembly and the rear frame assembly have the same structure and each include a U-shaped frame and a connecting rod fixed to the lower end of the U-shaped frame, and casters are arranged on both sides of the U-shaped frame.

Further, the scissor rod group includes two X-shaped rods hinged to each other, and the lower side of the one end of the X-shaped rod is hinged to the cross rod.

Further, the folding trolley further include a cloth bag, both ends of the cloth bag are detachably connected to the front frame assembly and the rear frame assembly through buckle structures; and the buckle structure includes slide seats fixed to four corners of the cloth bag, and both sides of the front frame assembly and the rear frame assembly are provided with fixed seats matched with the slide seats.

Further, the fixed seat is provided with a T-shaped slide block, the T-shaped slide block is provided with an elastic sheet, and the end of the elastic sheet is provided with a limiting convex point; the slide seat is provided with a T-shaped slide groove matched with the T-shaped slide block, and the T-shaped slide groove is internally provided with a limiting groove matched with the limiting convex point; and when detaching, the slide seat is slid upward to separate the limiting convex point from the limiting groove, separating the slide seat from the fixed seat. The T-shaped slide groove is internally provided with a clamp block extending downward, and the T-shaped slide block is provided with a clamp groove matched with the clamp block.

(III) Beneficial Effect

According to the folding trolley provided by the invention, one ends of the scissor rod groups are rotatably connected to the front and rear frames, and the other ends are slidably connected to the front and rear frames, such that its structure is simple, and it is more convenient to unfold and fold. At the same time, it also solves the disadvantages of large deformation of the folding trolley after folding and requirements of additional parts and additional turning points, makes the folding trolley process simpler and stronger, and overcomes the defects of complex technology and low strength of an existing folding trolley.

LIST OF NUMERALS

1. Front frame assembly; 11. U-shaped frame; 12. Connecting rod; 13. Caster; 101. Vertical slide groove; 2. Rear frame assembly; 3. Bottom frame unfolding and folding assembly; 31. First folding frame; 32. Second folding frame; 33. Connecting seat; 4. Side frame unfolding and folding assembly; 41. Scissor rod group; 42. Slide block; 43. Cross rod; 411. X-shaped rod; 5. Hinged seat; 6. Cloth bag; 7. Pull rod assembly; 81. Slide seat; 82. Fixed seat; 83. T-shaped slide block; 84. Elastic sheet; 85. Limiting convex point; 86. T-shaped slide groove; 87. Limiting groove; 88. Clamp block; and 89. Clamp groove.

DETAILED DESCRIPTION

The specific implementations of the invention will be described in further detail below with reference to the accompanying drawings and embodiments. The following embodiments are used to illustrate the invention, but are not intended to limit the scope of the invention.

Embodiment 1

Referring to FIGS. 1 to 8, this embodiment provides a folding trolley, including a front frame assembly 1 and a rear frame assembly 2 arranged at an interval. The front frame assembly 1 and the rear frame assembly 2 are connected through a bottom frame folding and unfolding assembly 3. Side frame folding and unfolding assemblies 4 are symmetrically arranged on both sides of the bottom frame folding and unfolding assembly 3. The side frame folding and unfolding assembly 4 includes a scissor rod group 41. The upper sides of both ends of the scissor rod group 41 are slidably connected to the front frame assembly 1 and the rear frame assembly 2 respectively. The lower sides of both ends of the scissor rod group are hinged to the front frame assembly 1 and the rear frame assembly 2 respectively.

Figure 6:
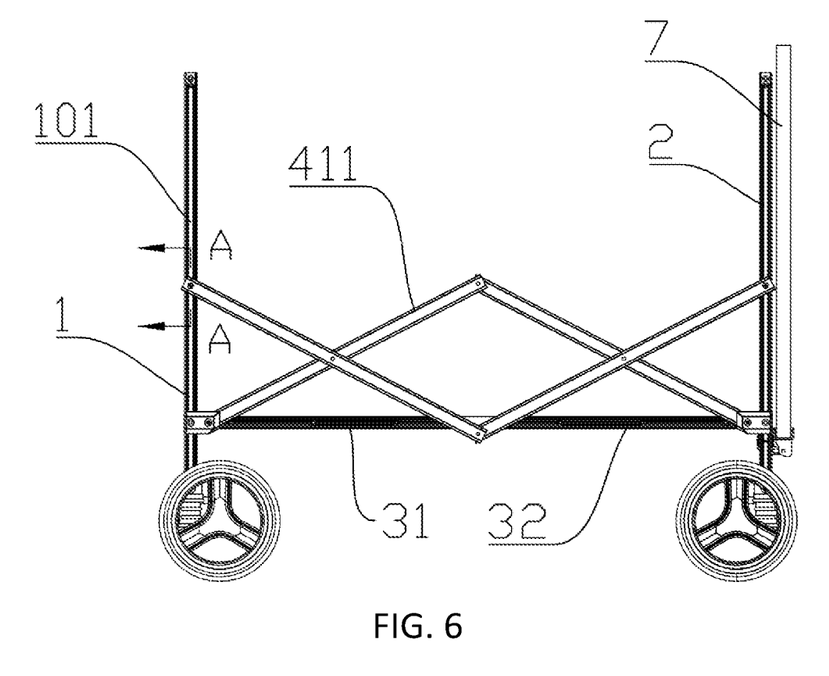
FIG. 6 is a main structural view of the folding trolley in Embodiment 1.
Figure 7:
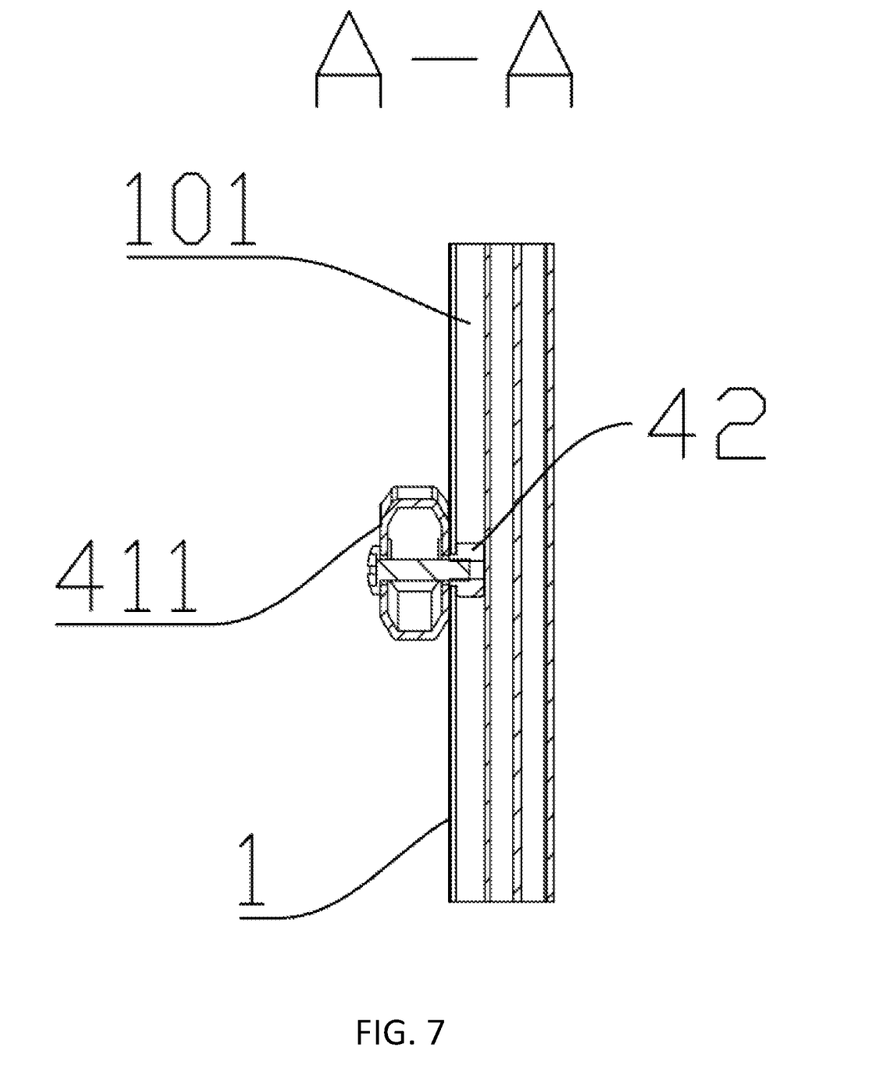
FIG. 7 is a sectional view of FIG. 6 along section A-A.
Figure 8:
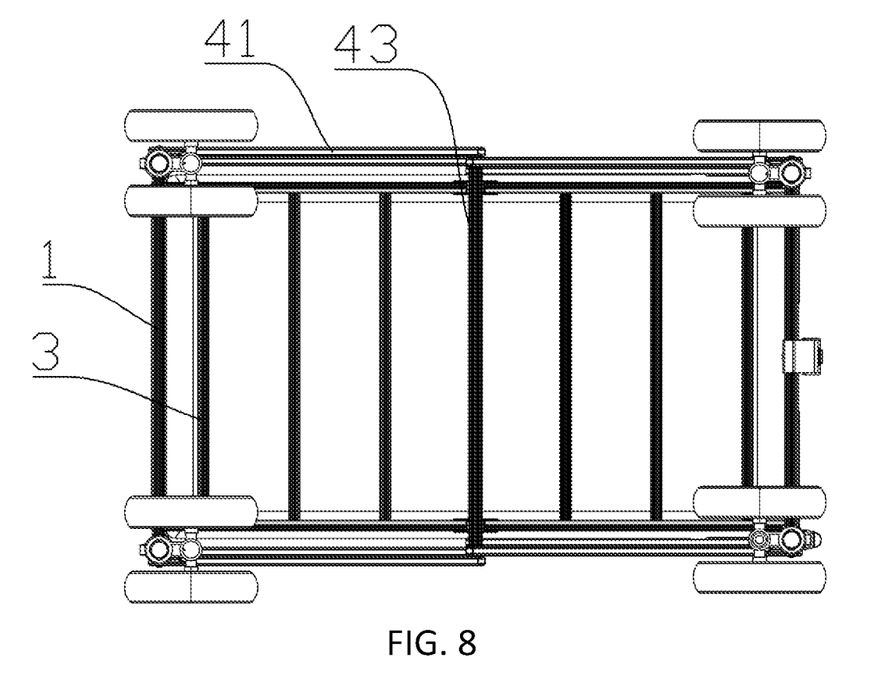
FIG. 8 is a top structural view of the folding trolley in Embodiment 1.

Referring to FIGS. 6 and 7, the front frame assembly 1 and the rear frame assembly 2 are provided with vertical slide grooves 101. Slide blocks 42 are hinged to the upper sides of both ends of the scissor rod group 41. The slide block 42 is slidably arranged within the vertical slide groove 101. The lower sides of both ends of the scissor rod group 41 are respectively hinged to the front frame assembly 1 and the rear frame assembly 2 through hinged seats 5. The scissor rod group 41 includes two X-shaped rods 411 hinged to each other. The lower side of one end of the X-shaped rod 411 is hinged to the cross rod 43. The X-shaped rod 411 includes two straight rods hinged in the middle.

Figure 2:
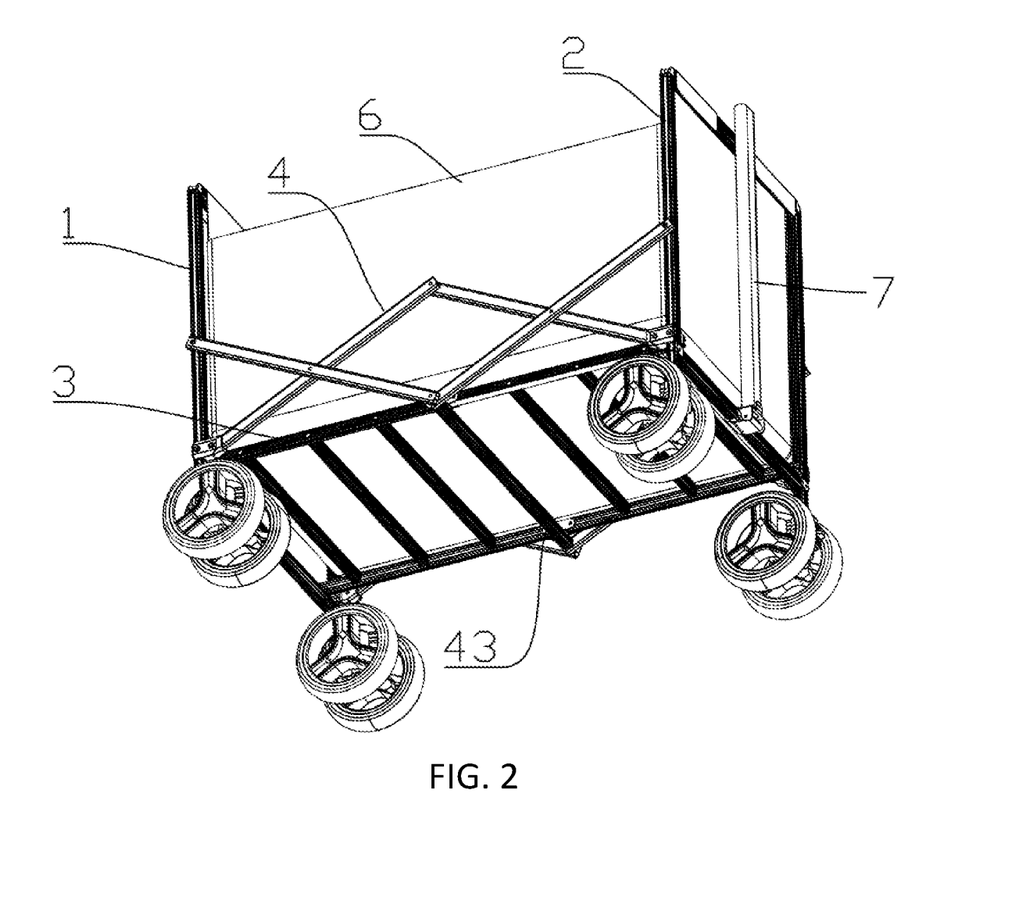
FIG. 2 is a three-dimensional bottom view of the folding trolley in Embodiment 1.

Referring to FIGS. 2 and 6, the bottom frame folding and unfolding assembly 3 includes a first folding frame 31 and a second folding frame 32 hinged to each other. The front end of the first folding frame 31 is hinged to the front frame assembly 1, and the rear end of the second folding frame 32 is hinged to the rear frame assembly 2. The scissor rod groups 41 located at both sides are connected through the cross rod 43. The cross rod 43 is located at the lower side between the first folding frame 31 and the second folding frame 32. The bottom frame folding and unfolding assembly 3 further includes a connecting seat 33. The first folding frame 31 and the second folding frame 32 are hinged to both sides of the connecting seat 33. The cross rod 43 abuts against the lower end of the connecting seat 33.

Figure 1:
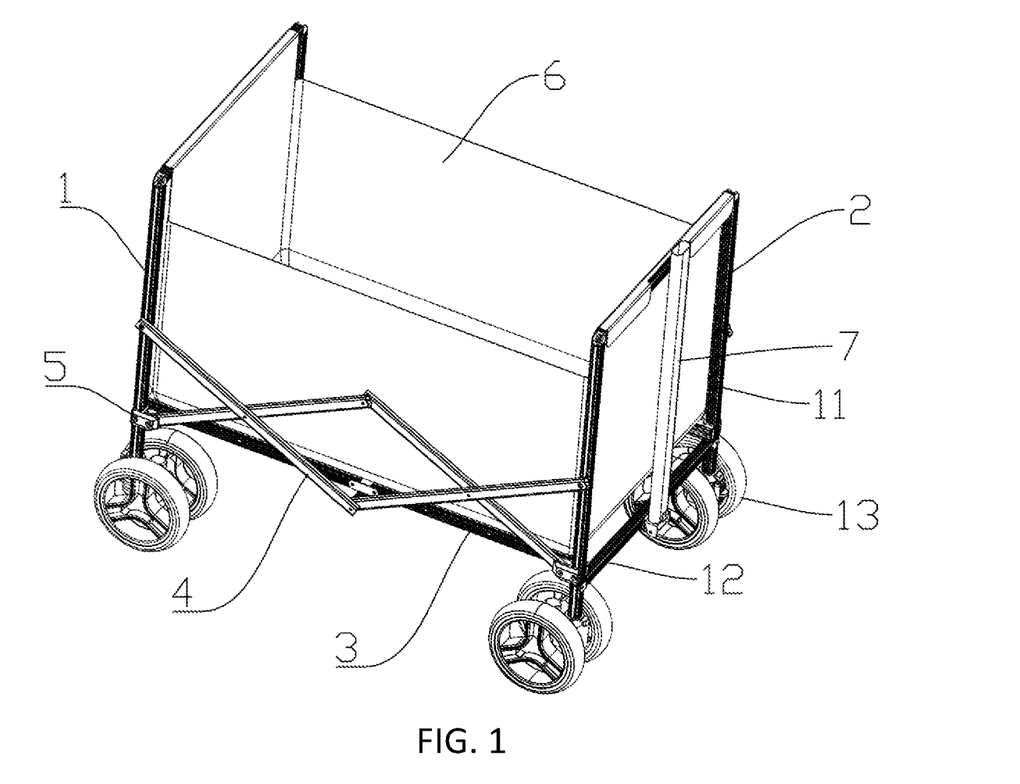
FIG. 1 is a three-dimensional view of a folding trolley in Embodiment 1.

Referring to FIGS. 1 and 2, the folding trolley further includes a cloth bag 6 and a pull rod assembly 7. The front end of the cloth bag 6 is fixed to the front frame assembly 1, the rear end of the cloth bag is fixed to the rear frame assembly 2, and the pull rod assembly 7 is hinged to the rear frame assembly 2.

Figure 3:
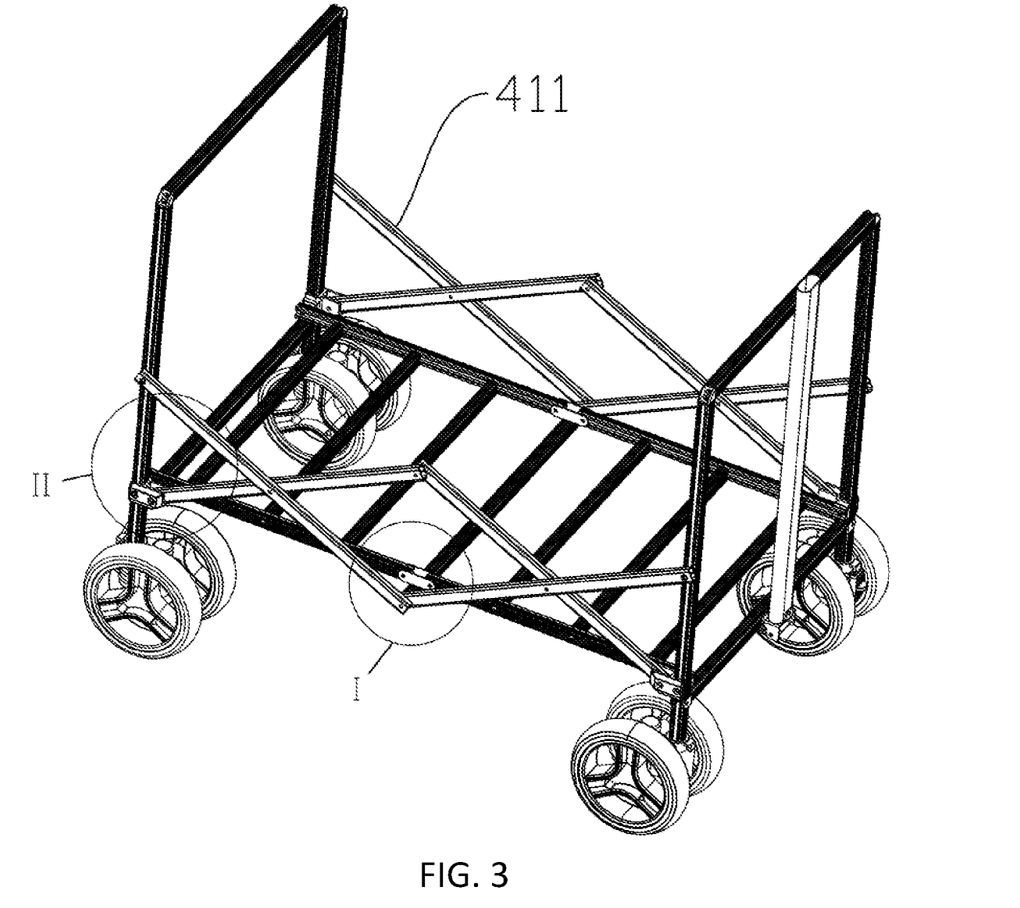
FIG. 3 is a three-dimensional view of the folding trolley in Embodiment 1 with a cloth bag removed.
Figure 4:
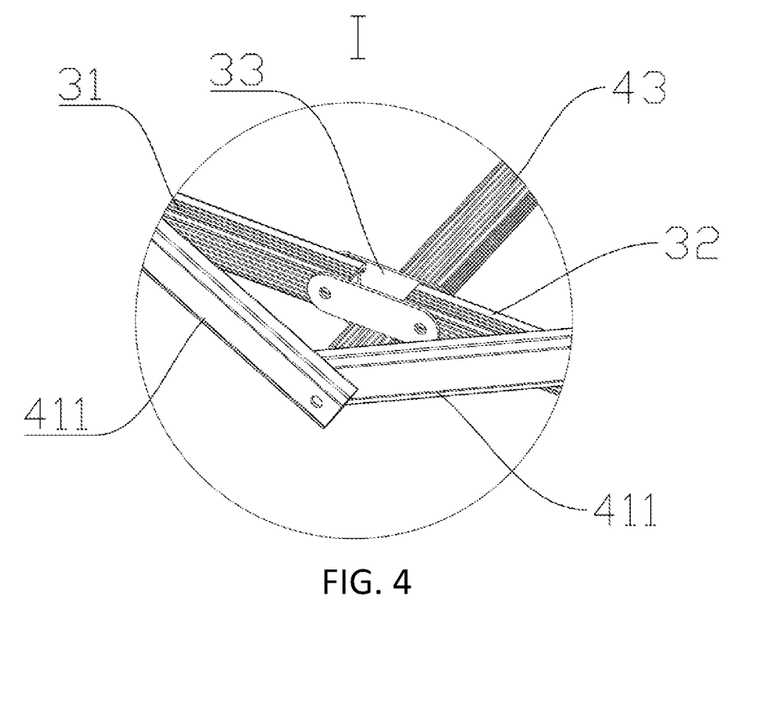
FIG. 4 is an enlarged view of Part I of FIG. 3.
Figure 5:
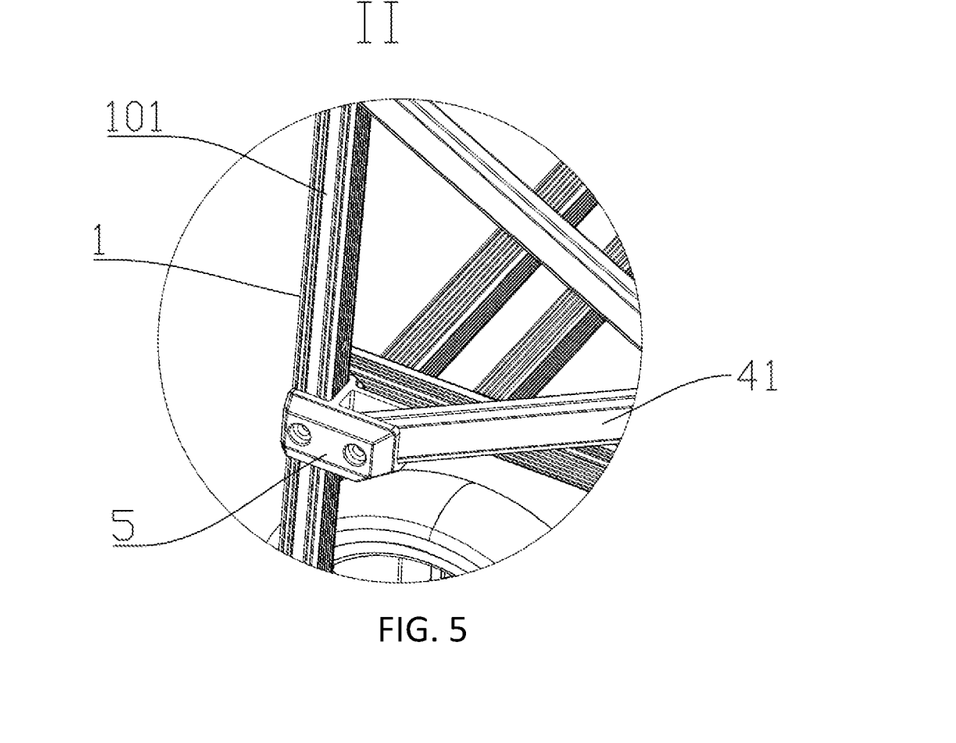
FIG. 5 is an enlarged view of Part II of FIG. 3.

Referring to FIGS. 1 to 3, the front frame assembly 1 and the rear frame assembly 2 have the same structure and each include a U-shaped frame 11 and a connecting rod 12 fixed to the lower end of the U-shaped frame 11. Casters 13 are arranged on both sides of the U-shaped frame 11.

When folding, the cross rod 43 is pulled up, the first folding frame 31 and the second folding frame 32 are rotated downward to fold, and the front frame assembly 1 and the rear frame assembly 2 are moved to the middle at the same time, and the scissor rod group 41 is closed accordingly.

According to the folding trolley provided in this embodiment, one end of the scissor rod group is rotatably connected to the front and rear frames, and the other end is slidably connected to the front and rear frames, such that its structure is simple, and it is more convenient to unfold and fold. At the same time, it also solves the disadvantages of large deformation of the folding trolley after folding and requirements of additional parts and additional turning points, makes the folding trolley process simpler and stronger, and overcomes the defects of complex technology and low strength of an existing folding trolley.

Embodiment 2

Figure 9:
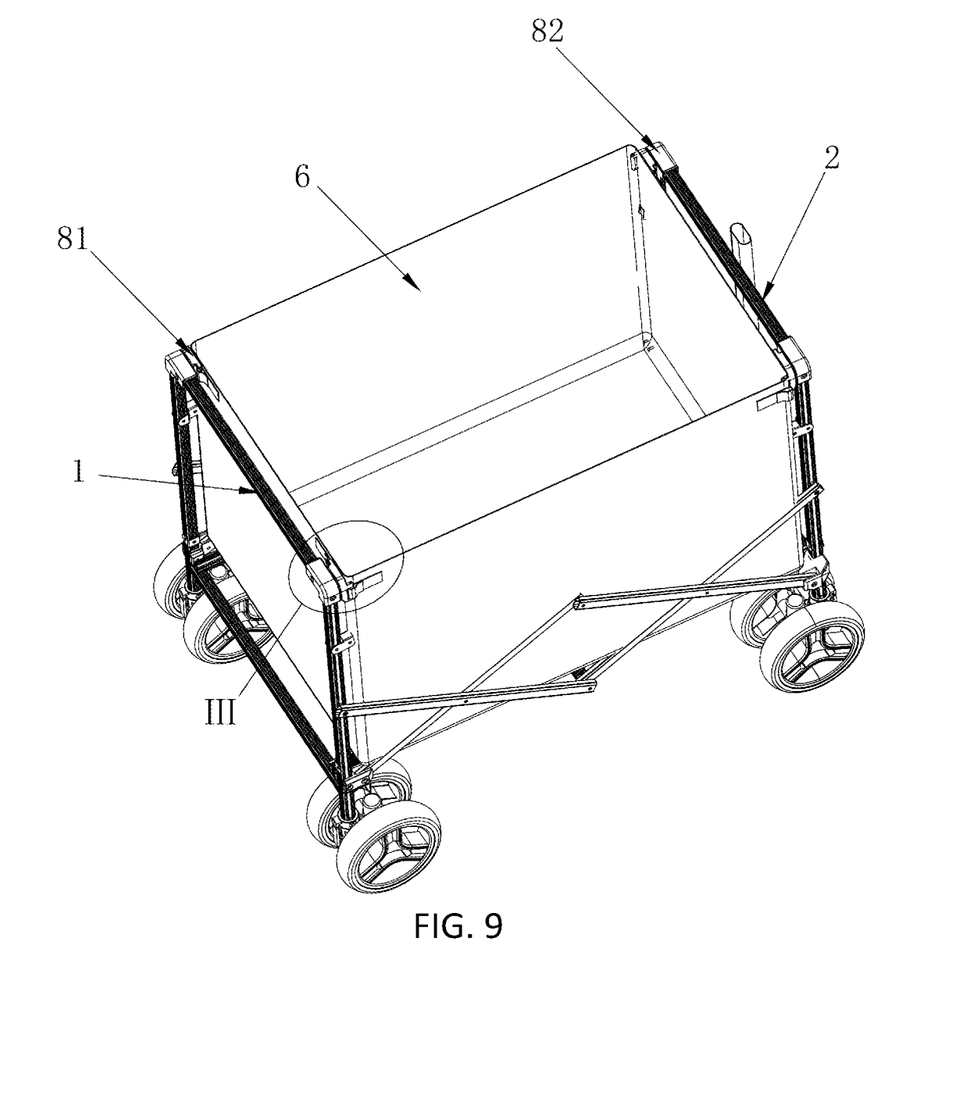
FIG. 9 is a three-dimensional view of a folding trolley in Embodiment 2.
Figure 10:
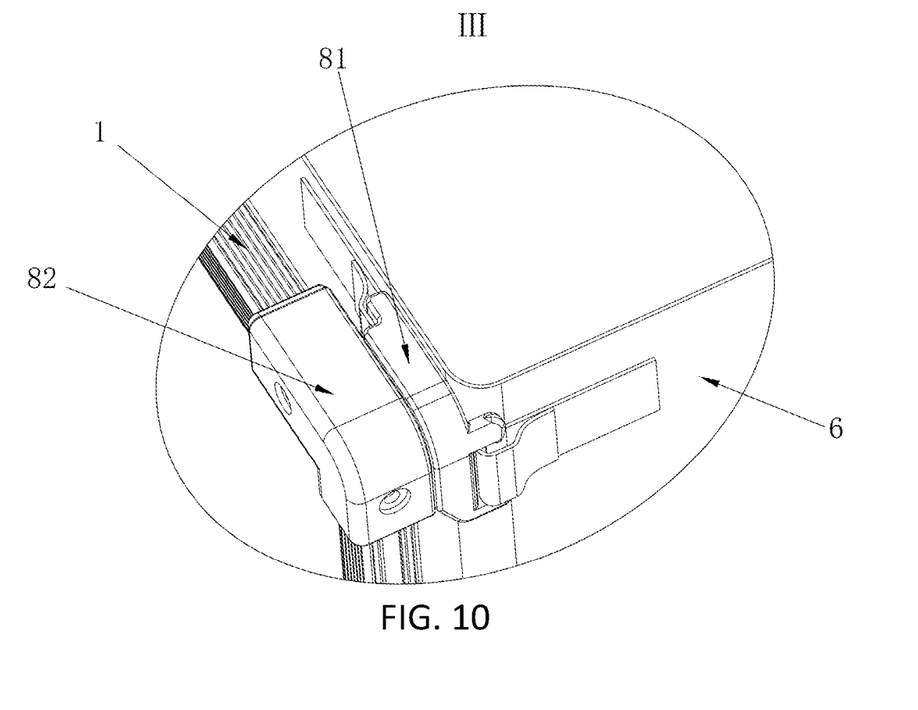
FIG. 10 is an enlarged view of Part III of FIG. 9.

The difference between the folding trolley provided in this embodiment and Embodiment 1 is that: the cloth bag 6 is installed in different ways. As mentioned above, the scissors rod group 41 of the folding trolley is in the lower part after unfolding, which will lead to poor support for the upper part of the folding trolley. In this embodiment, both ends of the cloth bag 6 are detachably connected to the front frame assembly 1 and the rear frame assembly 2 through buckle structures. First, after the mouth of the cloth bag is expanded, the mouth of the cloth sleeve is pulled by the front frame assembly and the rear frame assembly to make the upper part better supported, preventing articles loaded from falling down due to lack of support of the upper part of the folding trolley. Second, it is also convenient for installation and disassembly, and more convenient for use.

Referring to FIGS. 9 to 13, the buckle structure includes slide seats 81 fixed to four corners of the cloth bag 6. Both sides of the front frame assembly 1 and the rear frame assembly 2 are provided with fixed seats 82 matched with the slide seats 81. The slide seat 81 is slidably arranged on the fixed seat 82. The fixed seat 82 is provided with a T-shaped slide block 83. The T-shaped slide block 83 is provided with an elastic sheet 84. The end of the elastic sheet 84 is provided with a limiting convex point 85. The slide seat 81 is provided with a T-shaped slide groove 86 matched with the T-shaped slide block 83. The lower end of the T-shaped slide groove is provided with an opening, such that the T-shaped slide block slides into conveniently. The T-shaped slide groove 86 is internally provided with a limiting groove 87 matched with the limiting convex point 85. The slide seat 81 and the fixed seat 82 make the installation and removal of the cloth sleeve more convenient. After the frame is unfolded, with four corners of the cloth sleeve being unfolded, the mouth of the cloth sleeve is pulled by the front frame assembly and the rear frame assembly, so that the mouth of the cloth sleeve is supported well.

During installation, the slide seat is arranged on the fixed seat under the cooperation of the T-shaped slide groove and the T-shaped slide block. Then the slide seat is slid downward to place the limiting convex point in the limiting groove. In this case, the limiting convex point has a certain limiting effect to prevent the slide seat from separating from the fixed seat. When detaching, the slide seat 81 is slid upward, with the force that can deform the elastic sheet. The limiting convex point 85 is separated from the limiting groove 87. Then the slide seat 81 is separated from the fixed seat 82.

Figure 11:
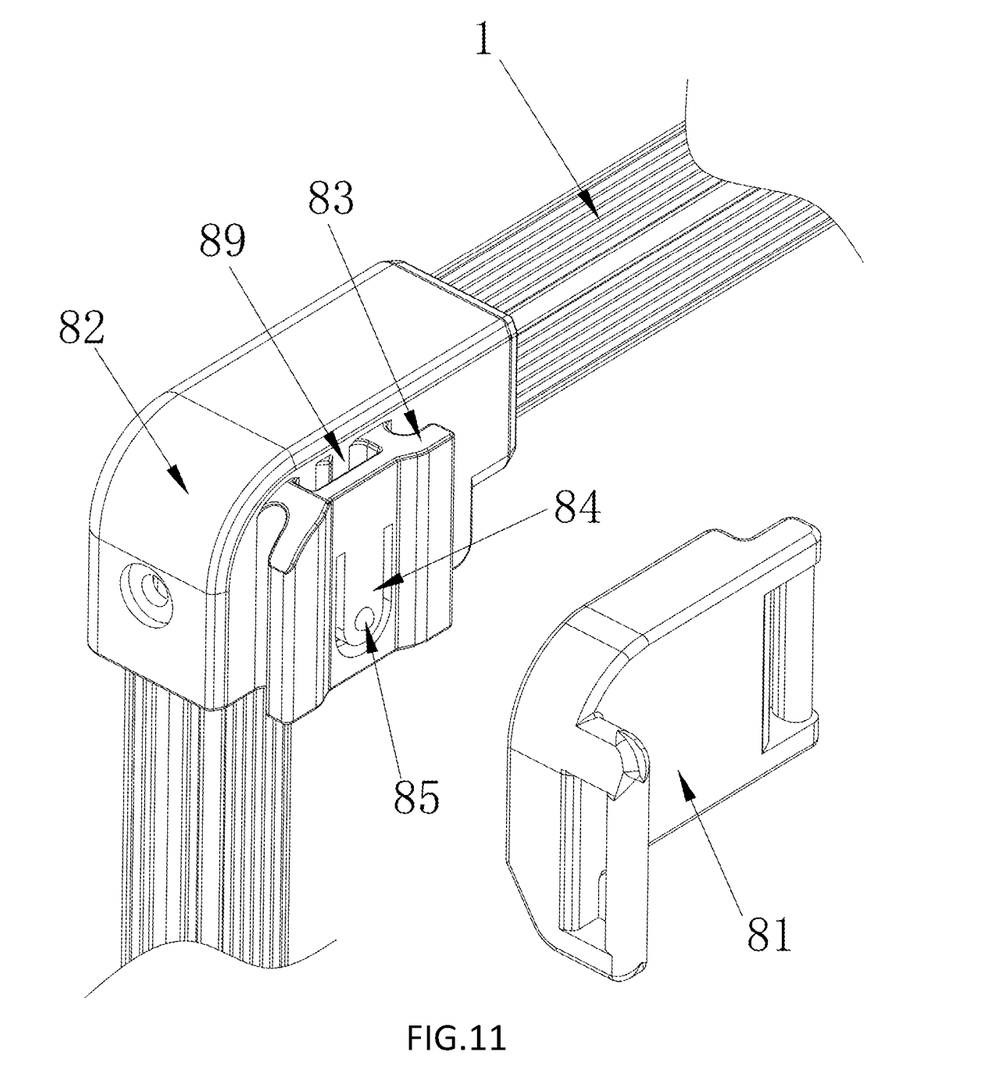
FIG. 11 is an exploded view of a buckle structure of the folding trolley in Embodiment 2.
Figure 12:
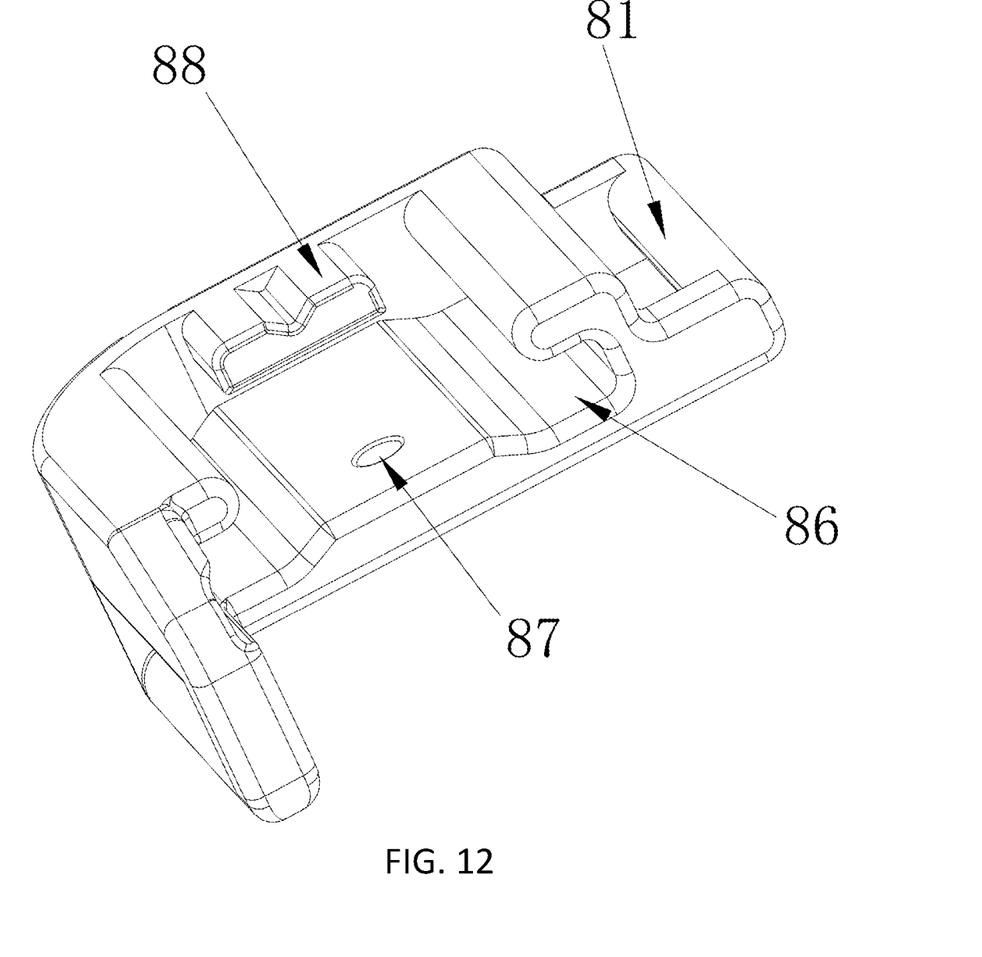
FIG. 12 is a three-dimensional view of a slide seat of the folding trolley in Embodiment 2.
Figure 13:
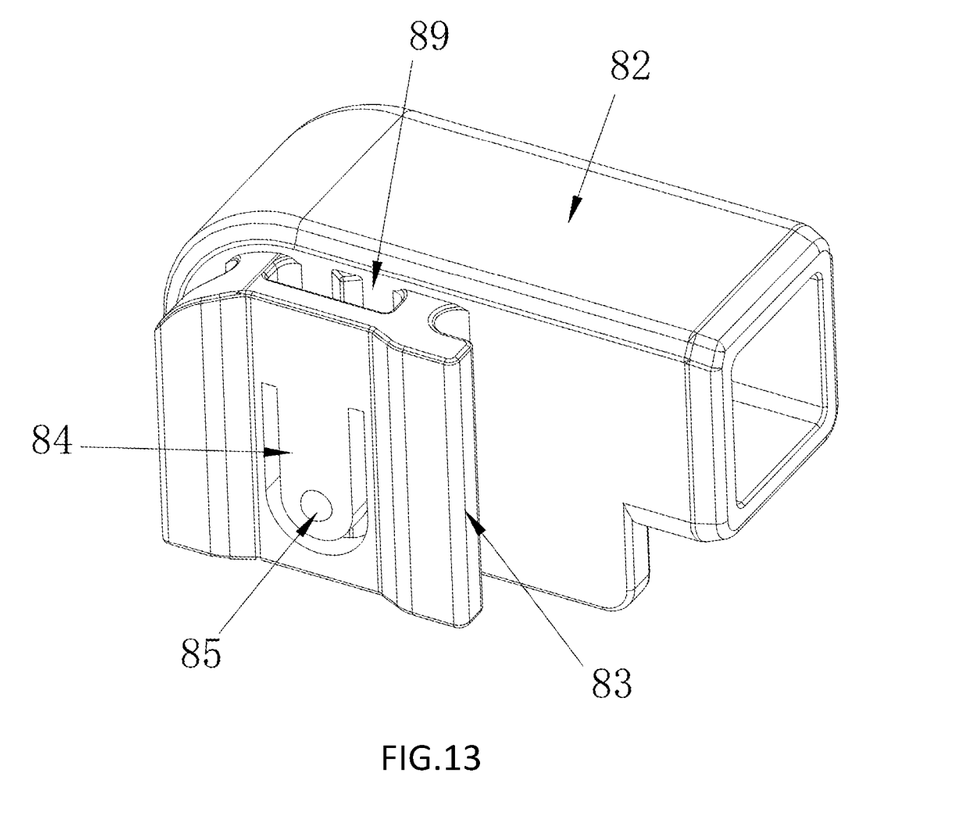
FIG. 13 is a three-dimensional view of a fixed seat of the folding trolley in Embodiment 2.

The T-shaped slide groove 86 is internally provided with a clamp block 88 extending downward. The T-shaped slide block 83 is provided with a clamp groove 89 matched with the clamp block 88. The clamp block can slide into the clamp groove to increase the support strength.

According to the folding trolley provided in this embodiment, both ends of the cloth bag are detachably connected through the buckle structures, such that the connection is stable, the detachment is not easy, and the assembly, disassembly and use are convenient.

The above are only the preferred implementations of the invention. It should be pointed out that for those skilled in the art, without departing from the technical principles of the invention, several improvements and modifications can be made. These improvements and retouching should also be regarded as the protection scope of the invention.

The invention claimed is:

1. A folding trolley, comprising a front frame assembly and a rear frame assembly arranged at an interval, wherein the front frame assembly and the rear frame assembly are connected through a bottom frame folding and unfolding assembly; side frame folding and unfolding assemblies are symmetrically arranged on both sides of the bottom frame folding and unfolding assembly; and the side frame folding and unfolding assembly comprises a scissor rod group, the upper sides of both ends of the scissor rod group are slidably connected to the front frame assembly and the rear frame assembly respectively, and the lower sides of both ends of the scissor rod group are hinged to the front frame assembly and the rear frame assembly respectively; wherein the front frame assembly and the rear frame assembly are provided with vertical slide grooves, slide blocks are hinged to the upper sides of both ends of the scissor rod group, and the slide block is slidably arranged within the vertical slide groove.

2. The folding trolley of claim 1, wherein the bottom frame folding and unfolding assembly comprises a first folding frame and a second folding frame hinged to each other, the front end of the first folding frame is hinged to the front frame assembly, and the rear end of the second folding frame is hinged to the rear frame assembly.

3. The folding trolley of claim 2, wherein the scissor rod groups located at both sides are connected through a cross rod, the cross rod is located at the lower side between the first folding frame and the second folding frame; and when folding, the cross rod is pulled up, the front frame assembly and the rear frame assembly are moved to the middle, and the scissor rod group is closed.

4. The folding trolley of claim 3, wherein the bottom frame folding and unfolding assembly further comprises a connecting seat, and the first folding frame and the second folding frame are hinged to both sides of the connecting seat; and the cross rod abuts against the lower end of the connecting seat.

5. The folding trolley of claim 3, wherein the scissor rod group comprises two X-shaped rods hinged to each other, and the lower side of the one end of the X-shaped rod is hinged to the cross rod.

6. The folding trolley of claim 1, wherein the lower sides of both ends of the scissor rod group are respectively hinged to the front frame assembly and the rear frame assembly through hinged seats.

7. The folding trolley of claim 1, further comprising a cloth bag and a pull rod assembly, the front end of the cloth bag is fixed to the front frame assembly, the rear end of the cloth bag is fixed to the rear frame assembly, and the pull rod assembly is hinged to the rear frame assembly.

8. The folding trolley of claim 1, wherein the front frame assembly and the rear frame assembly have the same structure and each comprise a U-shaped frame and a connecting rod fixed to the lower end of the U-shaped frame, and casters are arranged on both sides of the U-shaped frame.

9. The folding trolley of claim 1, further comprising a cloth bag, both ends of the cloth bag are detachably connected to the front frame assembly and the rear frame assembly through buckle structures; and the buckle structure comprises slide seats fixed to four corners of the cloth bag, and both sides of the front frame assembly and the rear frame assembly are provided with fixed seats matched with the slide seats.

10. The folding trolley of claim 9, wherein the fixed seat is provided with a T-shaped slide block, the T-shaped slide block is provided with an elastic sheet, and the end of the elastic sheet is provided with a limiting convex point; the slide seat is provided with a T-shaped slide groove matched with the T-shaped slide block, and the T-shaped slide groove is internally provided with a limiting groove matched with the limiting convex point; and when detaching, the slide seat is slid upward to separate the limiting convex point from the limiting groove, separating the slide seat from the fixed seat.

11. The folding trolley of claim 10, wherein the T-shaped slide groove is internally provided with a clamp block extending downward, and the T-shaped slide block is provided with a clamp groove matched with the clamp block.

* * * * *